United States Patent [19]

Rudzinski

[11] 4,000,858

[45] * Jan. 4, 1977

[54] METHOD AND APPARATUS FOR SCREENING AND COMMINUTING DEVICE

[76] Inventor: Stanley P. Rudzinski, 1156 S. Lombard Ave., Oak Park, Ill. 60304

[ * ] Notice: The portion of the term of this patent subsequent to July 8, 1992, has been disclaimed.

[22] Filed: May 23, 1975

[21] Appl. No.: 580,135

Related U.S. Application Data

[63] Continuation-in-part of Ser. No. 472,681, May 23, 1974, Pat. No. 3,893,923.

[52] U.S. Cl. .............................. 241/27; 241/46.11; 241/243
[51] Int. Cl.² ........................................ B02C 23/36
[58] Field of Search ............. 241/15, 21, 27, 46 R, 241/46.11, 46.17, 243, 244, 260, 261, 292.1, 293, 300.1; 83/698

[56] References Cited

UNITED STATES PATENTS

| | | | |
|---|---|---|---|
| 1,131,230 | 3/1915 | Giddings | 241/243 |
| 3,214,106 | 10/1965 | Gorman | 83/698 |
| 3,812,967 | 5/1974 | Rudzinski | 210/174 |
| 3,893,923 | 7/1975 | Rudzinski | 210/161 |

Primary Examiner—Granville Y. Custer, Jr.

[57] ABSTRACT

A comminutor for comminuting solid materials carried by flowing fluids, such as industrial wastes or sewage, in which cutter elements carried by a plurality of rotating rings forming a cone shaped rotor co-act with stationary cutter elements supported alongside the rotor, and a method of comminuting. The stationary cutter elements are reversable so that upon repositioning, new stationary cutting edges are presented to the cutter elements carried by the rotating rings. A plurality of stationary cutter elements are formed on a single structure, each stationary cutter element forming a cutting station. The cutting action is further increased by providing co-acting cutting edges in planes perpendicular as well as parallel to the rotor axis at each cutting station.

5 Claims, 5 Drawing Figures

METHOD AND APPARATUS FOR SCREENING AND COMMINUTING DEVICE

This application is a continuation-in-part application of applicant's prior co-pending application Ser. No. 472,681, filed May 23, 1974, now U.S Pat. No. 3,893,923 issued July 8, 1975.

This invention relates to comminuting machines, and specifically to a comminutor having a rotor carrying a plurality of moveable cutting elements which co-act with stationary cutting elements to finely shred or comminute solids carried in fluids passing through the comminutor, wherein both the stationary and moveable cutting elements are quickly and easily attached and removed, while at the same time a structure of maximum rigidity and shock absorbing capacity is provided. The invention also includes a method of comminuting.

BACKGROUND OF THE INVENTION

Screening and comminuting machines, hereafter sometimes referred to as comminutors, are required in waste treatment installations to prevent clogging of valves, pumps, and other apparatus by reducing the size of foreign material that enter the treatment installation together with the liquid wastes which carry the foreign material. Comminution promotes the speed with which the treatment and purification of waste materials is carried out. Efficient and reliable cutting of suspended solids is essential and, at the same time, the comminutor must be simple in construction, economical in cost of operation, and require a minimum maintenance and servicing effort since the machines may be installed in locations which are not readily accessible.

SUMMARY OF THE INVENTION

The invention includes a method of comminuting and a comminutor in which a generally horizontally oriented rotor, composed of a number of spaced rings of successively larger diameter in a downstream direction of flow, each ring carrying a plurality of cutting elements, rotates in cutting relation to a generally horizontally oriented stationary cutter bar assembly. Smooth and even cutting is provided with a scissors or shearing type action.

Accordingly, a primary object of the invention is to provide a screening and comminuting device for fluid materials which has an improved cutting action, as contrasted to present machines, wherein solids are simultaneously cut or sheared in directions substantially parallel and perpendicular to the axis of rotation of the comminutor rotor.

Another object of the invention is to increase the useful screening area of the rotary screen formed by the comminutor rotor by utilizing the stationary cutting elements to keep the flow openings in the screen free from accumulation of oils, grease and other adherent material carried by the fluid being treated whereby the fluid flow and the screening action is not decreased when the machine is used with fluids containing such materials.

A further object is to provide a comminutor which may be maintained in a predetermined position of maximum affectiveness within the fluid flow channel in which it is located without the necessity of using holding devices, stops, or structural modifications to the flow channel.

Other objects and advantages will become apparent from a reading of the following description of the invention.

BRIEF DESCRIPTION OF DRAWINGS

The invention is illustrated more or less diagramatically in the accompanying drawing wherein.

DETAILED DESCRIPTION OF THE INVENTION

Figure 1:
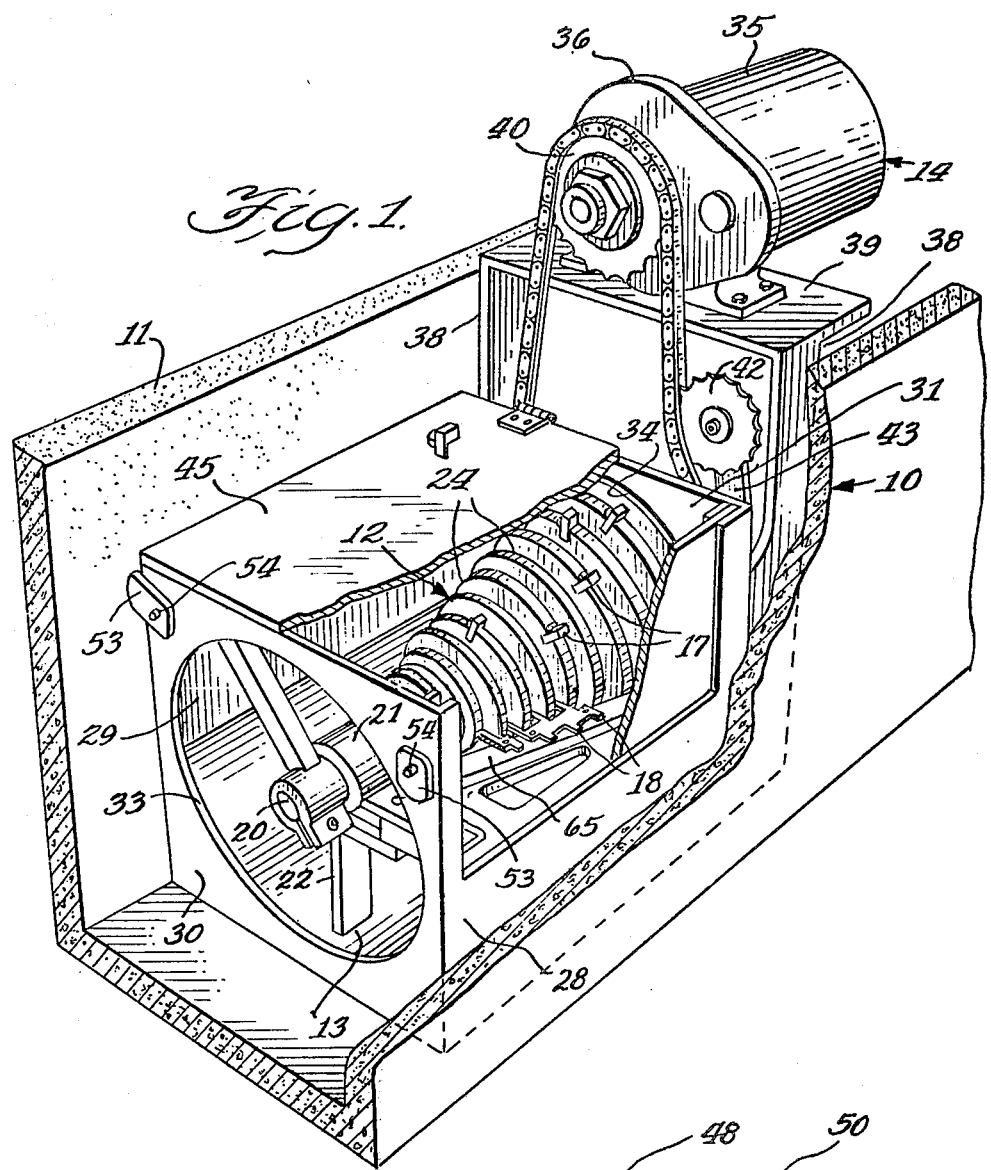
FIG. 1 is a perspective view of a screening and comminuting device of the present invention shown positioned in a waste fluid flow channel.

Like reference numerals will be used to refer to like parts from Figure to Figure.

Referring first to FIG. 1, an improved comminuting and screening apparatus, hereafter sometimes referred to as a comminutor, is generally indicated at 10. The comminutor is shown located in a rectangular waste liquid flow channel 11. The channel may, for example, carry sewage or other waste fluids having solids which must be comminuted or screened out prior to treatment or discharge of the fluid. The comminutor includes a rotor, indicated generally at 12, a support structure 13, and a drive assembly, indicated generally at 14. A plurality of moveable cutter elements 17 are carried by the rotor 12, and a stationary cutter element is indicated at 18, the stationary cutter elements being carried by the support structure 13. In the assembly of FIG. 1, the directional flow of the waste material which must pass through the comminutor is from left to right. The upstream side of the communitor will hereafter be referred to as the front, and the downstream side as the rear.

Rotor 12 is a unitary structure including a concentric axle or shaft 20 which is supported at its upstream or front end by a bearing or journal 21, and at its downstream or rear end by a similar bearing element and support structure, not shown. Bearing 21 is supported at the top of a vertical support column 22, and a similar bearing, not shown, which supports the downstream end of the shaft is likewise supported from the upper end of a vertical support column, not shown. The vertical support columns are rigidly mounted on the support structure 13 in such fashion that the axis of rotation of the rotor 12 is substantially parallel to the direction of fluid flow in the flow channel 11.

Figure 4:
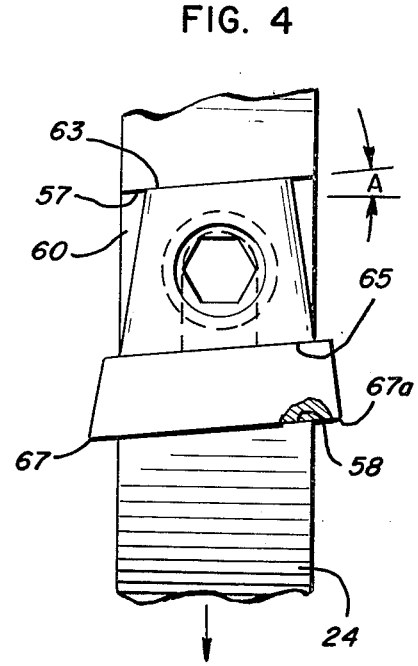
FIG. 4 is a side view to an enlarged scale showing the unique cutter element of this invention installed in a screening element.
Figure 5:
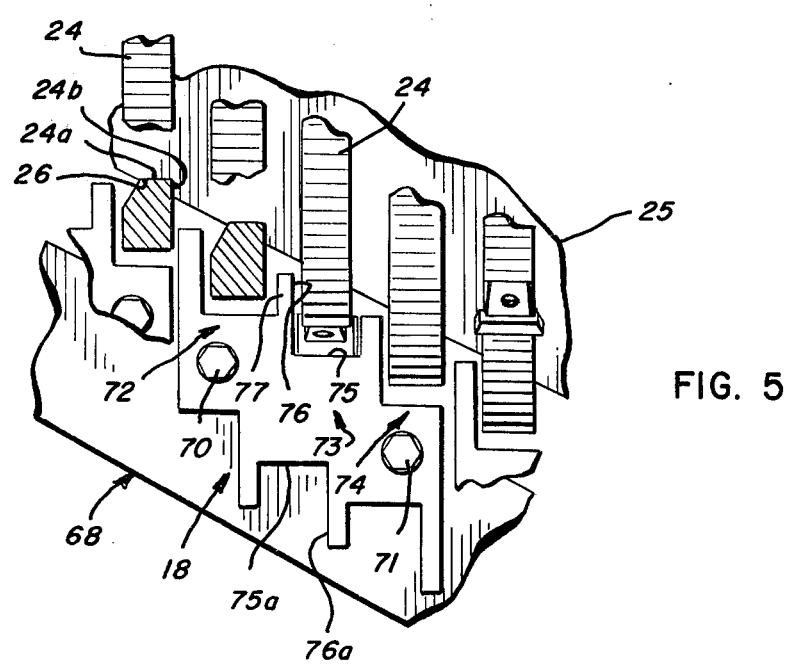
FIG. 5 is a partial plan view to a larger scale than that of FIG. 1 of the cutter arrangement showing the screening elements and the relationship of the stationary and moveable cutter elements.

Rotor 12 is formed from a series of circular screening rings 24 which are welded or otherwise suitably secured to a plurality of ribs 25, see FIG. 5, which rings 24 are arranged generally perpendicular to shaft 20 to form a downstream diverging structure all as illustrated and described in greater detail in FIGS. 4 and 5 of U.S. Pat. No. 3,812,967 and the appropriate accompanying text therein, particularly lines 55–58 of column 2, which disclosure is incorporated hereby by reference.

The ribs, the outer radial surface of each of which may be arcuately contoured so as to form a complimentary fit with the interiors of the rings 24, are fixed longitudinally to axle 20 between the journals, and are equally spaced around the shaft and extend substantially equal radial distances outwardly therefrom to provide a balanced, vibration free structure. The screening rings 24 increase in diameter from the upstream to the downstream ends of rotor 12, and are spaced apart axially to form screening apertures or slots therebetween to thereby permit flow of fluids and comminuted materials there between. As best seen in FIG. 5, the screening rings 24 have a cylindrical inner face 24a, and a radial downstream face 24b disposed perpendicularly to the inner face. The rings 24 are welded or otherwise affixed to circular notches or steps 26 formed in the periphery of ribs 25. From FIG. 5 it will be noted that the outer face of each ring 24 is cylindrical; that is, each straight line segment in the outer surface is disposed substantially parallel to the axis of rotation of rotor 12.

As best seen in FIGS. 1 and 5, the diameter of each succeeding downstream ring 24 is larger than the diameter of the preceding upstream ring. From FIG. 5, it will be noted that the inner diameter of each ring is less than the outer diameter of the preceding, upstream ring. As a result, a series of steps is formed on the outer surface of the rotor so that fluids passing along the outer surface will encounter a series of interruptions with a resultant turbulent flow. This construction assists in cleaning the rings of debris screened from the fluid and redistributes such debris for comminuting by the cutter elements 17, 18. This construction also causes the fluid flow to bend sharply radially inwardly in order to pass between the rings and toward the rear of the machine, thereby further enhancing the screening capability of the comminutor.

An arrangement of shields and baffles surrounding the rotor 12 directs fluid flow to and through the rotor. Upright sidewalls 28, 29 prevent initial entry of fluids and waste material from the flowing stream from a radially inward direction. Front and rear upright baffles 30, 31 extend across the width of the channel 11, and are integral with sidewalls 28 and 29. Both the front and rear baffles have central openings 33, 34, respectively, which openings are approximately the size and shape of the largest screening ring 24 of rotor 12. The rear baffle plate 31, which is radially aligned with the rear of rotor 12 forms, with the rotor, a barrier to the passage of fluids through the comminutor with the result that fluid is forced to pass between the screening rings to reach the downstream side of the comminutor. It will be noted from FIG. 1 that the last ring 24 carries no cutter elements 17 so as to provide minimal clearance between said last ring and the opening in rear baffle plate 31.

Suitable drive means, such as electric motor 35 and speed reducing gearing 36, drive the rotor. Motor 35 and gearing 36 are supported on a base plate 39 which is supported by upright plates 38 and 39. A chain drives rotor 12 via gearing, not shown, integral with the rear end of the rotor via drive sprocket 40 carried by the output shaft of speed reducer 36. Idler sprocket 42 takes up slack in the roller chain drive, idler 42 being carried by an arm 43 which is pivotally mounted on the rear of baffle plate 31 and adjustable to take up slack.

A protective shield means for rotor 12 is provided to protect operators and the comminutor itself against damage, as from hard objects which might be dropped against it. The shield means comprises a cover plate 45 extending forwardly above rotor 12 from the rear baffle plate 31 to above the front end of rotor 12, and is swingable about a pair of hinges 46. Plate 45 may be propped open to any extent by suitable means.

Figure 2:
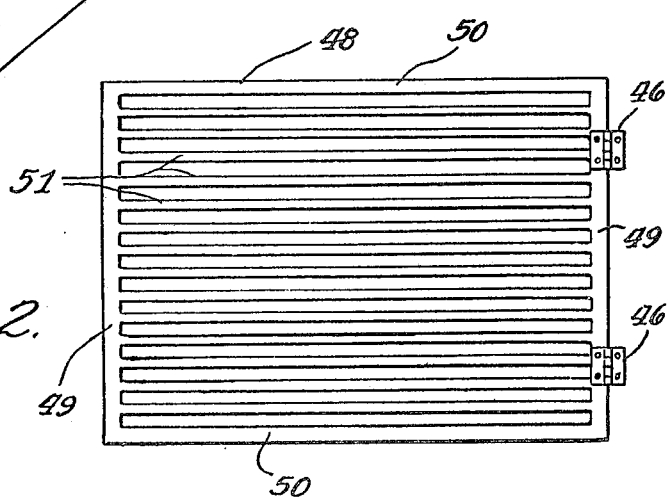
FIG. 2 is a plan view of an alternative construction of the coverplate for the comminutor of FIG. 1.

Another form of coverplate is indicated at 48 in FIG. 2. In cover 48 openings are formed in the cover to permit excess fluid to flow there through whereby unexpected surge conditions can be accommodated without lifting the cover. The width of the openings are so spaced as to intercept solid objects of appreciable size, the cover consisting of two side pieces 50, two end pieces 49, and a plurality of ribs 51.

Cam locking members 53 are pivotally mounted on the front baffle plate 30 by pivot pins 54. Cams 53 are eccentrically contoured so that, upon being forced into engagement with the sidewalls of channel 11, the comminutor will be wedged tightly in a fixed position to channel 11. The comminutor is thus held in place without use of bolts, grooves or other fastening means, or any alteration of the walls of channel 11.

Figure 3:
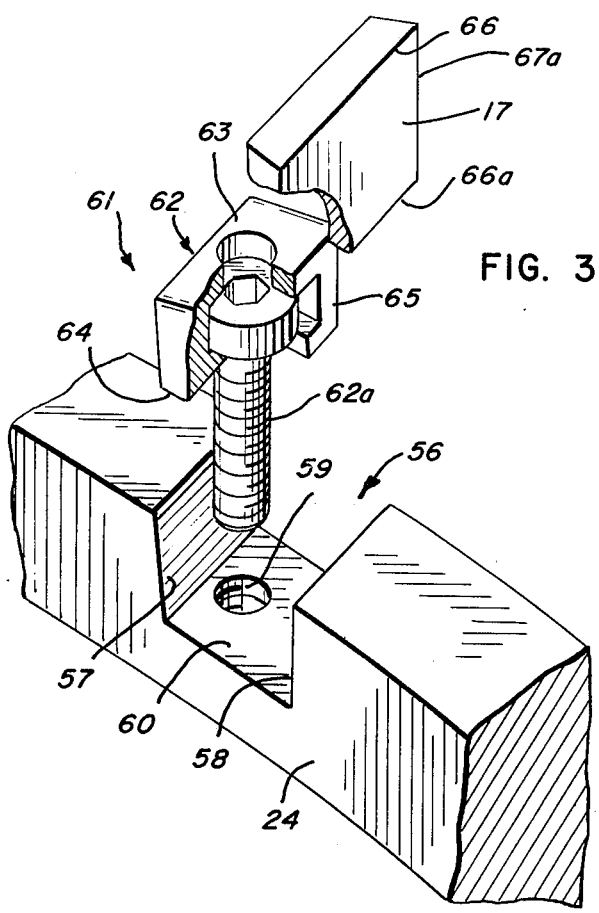
FIG. 3 is an exploded, perspective view with portions broken away of a portion of a screening element with its associated cutter assembly, including the cutter element locking device.

The cutting elements and their mode of operation is illustrated best in FIGS. 3, 4 and 5.

Referring first to FIG. 3, a portion of screening ring 24 is shown to an expanded scale. A slot 56 is formed in the periphery of ring 24, the slot having upper and lower opposed planar faces 57, 58, respectively. As best seen in FIG. 4, opposed faces 57, are cut at a slight angle, indicated at A with respect to a straight line segment parallel to the axis of rotation of ring 24. A threaded hole is indicated at 59 in base surface 60. A cutter holder assembly is indicated generally at 61, said assembly including a wedge member 62 and a fastener, in this instance a threaded bolt, 62a. As best seen in FIG. 3, the arcuate span of the radially outermost surface 63 is greater than the arcuate span of the radially innermost surface, the forward edge of which is indicated at 64. As a result, as the wedge member 62 is urged radially inwardly, as by tightening bolt 62a, a wedging force is exerted against cutter element or bit 17 which is inserted in slot 56 between base surface 58 and the facing side 65 of the wedge member 62.

Cutter element 17 has parallel upper and lower faces, as indicated best in FIG. 4, and is generally trapezoidal in cross section, also is illustrated best in FIG. 4. As a consequence, as ring 24 rotates in the direction of the arrow of FIG. 4 the radially outermost corner junction, indicated at 66, provides a cutting edge.

As best seen in FIG. 3, each cutter element 17 has two radial cutting edges 66, 66a, and two longitudinal or peripheral cutting edges 67, 67a whereby, in use, when one pair of radial and peripheral cutting edges is worn, a new pair can be provided by merely repositioning cutter element 17 by rotating said element 180°.

One of a series of stationary cutter members indicated at 18 is shown best in its entirety in FIG. 5. As best seen in that Figure, each stationary cutter member 18 is secured, by any suitable fasteners such as bolts 70, 71 to a horizontal support bar 68 which is integral with the housing and positioned generally horizontally to the axis of rotor 12 and, preferably, lies in substantially the same vertical plane which contains the shaft of rotor 12.

Each stationary cutter member 18 includes a plurality of cutting stations, here three in number, indicated generally at 72, 73 and 74 respectively. Cutting station 73 consists essentially of a cutting edge 75 which is disposed parallel to the cylindrical periphery of ring 24, and cutting edge 66, so that a shearing action occurs when edge 66 passes edge 75. Due to the inclination of moveable cutting element 17 as shown in FIG. 4, the shearing action will be of a scissors-type.

A second cutting edge 76 is formed on a projection 77 which extends radially inwardly toward the rotor axis. Cutting edge 76 is, as best seen in FIG. 5, disposed perpendicularly to cutting edge 75. Edge 75 in cooperation with cutting edge 67 on moveable cutter element 17 provides a cutting action as cutter element 17 moves past edge 76.

Projection 77 extends radially inwardly to a point just short of rib 25. Projection 77 serves to remove solid particles which may become lodged between the screening rings 24. Dislodged particles are then recut by a successive set of stationary and moveable cutter elements on either the same ring 24, or a different ring, depending upon the turbulence within the machine.

Projection 77 further prevents the buildup of grease, fats, and like materials which may be present in the fluid being treated. Such materials have a tendency to adhere to the screening rings and reduce the fluid flow by blocking the screening passages.

As best seen from FIG. 5, substantially similar cutting stations 72, 74 are formed on either side of cutting station 73 for purposes of ease and economy of fabrication, installation, removeable and maintenance.

Preferably, stationary cutter element 18 is double formed as illustrated in FIG. 5 so that when the cutting edges 75, 76 have worn too far to be effective in conjunction with cutting edges 66, 67 on cutter element 17, the entire cutting element 18 can be reversed, as by rotating 180°, and a fresh, sharp set of cutting edges 75a and 76a, respectively, presented to the moveable cutter element 17 carried by screening rings 24.

It will be understood that although the illustrated and described embodiment accomplishes the foregoing objects, alternative embodiments will be suggested to those skilled in the art upon reading the foregoing disclosure. Accordingly it is intended that the scope of the invention be limited not by the scope of the foregoing disclosure but solely by the scope of the hereafter appended claims when interpreted in light of the pertinent prior art.

I claim:

1. In a method of comminuting solid materials carried in a fluid which flows initially along a substantially uni-directional flow path, the steps of
    directing the fluid flow initially towards a rotating comminuting assembly in a direction substantially parallel to the axis of rotation of the comminuting assembly,
    generating a turbulent flow within a comminuting zone outside the rotating comminuting assembly whereby the fluid and solids carried thereby are directed along a fluid flow path which is generally radially inwardly oriented with respect to the axis of rotation of the comminuting assembly,
    shearing solids carried by the fluid,
    said shearing action occuring along shear lines which are generally parallel and perpendicular to the axis of rotation of the comminuting assembly, and
    discharging the fluid and comminuted solid materials at the downstream side of the comminuting assembly.

2. A comminutor, said comminutor including
    a housing adapted to be placed in a flow channel in a position to intercept fluids carrying solid materials which must be comminuted,
    a rotor in the housing, said rotor having its axis positioned substantially parallel to the flow path of said fluids, and being composed of
    an axial shaft assembly and a plurality of rings fixed with respect to and carried by the shaft assembly, said rings being of an increasing diameter in a downstream direction,
    each ring carrying a plurality of cutter elements which project radially outwardly from its associated ring,
    each ring cutter element being received in an opening in the periphery of its carrying ring, and being held in place by
    a wedge assembly including an apertured wedge member having a pair of opposed faces disposed in radially outwardly diverging relation to one another, one face being adapted to be placed in abutting relation to a surface of said opening, the other face being adapted to be placed in abutting relation to a surface of a cutter element located in the opening, and a fastener extending through said aperture in said wedge member and secured to said ring, and
    a stationary cutter element carried by support structure integral with the housing,
    said stationary cutter element being located adjacent to the path of travel of each cutter element carried by a ring whereby a cutting action occurs as each cutter element carried by a ring moves past an adjacent stationary cutter element.

3. The comminutor of claim 2 further characterized in that each stationary cutter element includes
    a plurality of cutting stations, each cutting station having a cutting edge disposed in substantially parallel relationship to the rotor axis,
    whereby a single stationary cutter element provides a cutting action for the cutter elements carried by a corresponding plurality of rings.

4. The comminutor of claim 3 further characterized in that
    each stationary cutter element has a plurality of oppositely disposed cutting edges at each cutting station whereby, upon reversal of said stationary element, a new series of cutting edges of the stationary cutter element are presented to the cutting edges of the cutter elements carried by the rings.

5. The comminutor of claim 4 further characterized in that
    each cutter element carried by each ring has an additional cutting edge disposed perpendicularly to the axis of the rotor, and
    each stationary cutter element, has an additional cutting edge formed on a projection which extends generally radially inwardly toward the rotor axis,
    said cutting edge on the projection being co-operable with the radial cutting edge on the cutter elements carried by the ring so as to provide two cutting actions at each stationary cutter station
    each of said inwardly extending projections terminating in closely spaced relationship to the shaft assembly which carries the rings and their associated cutter elements whereby said projections function to prevent build-up on the rotor of grease, fats and like materials which may be present in the fluid being treated.

* * * * *